United States Patent [19]

Dolejsi

[11] 4,161,996
[45] Jul. 24, 1979

[54] EXHAUST MUFFLER

[75] Inventor: Miroslav Dolejsi, Johanneshov, Sweden

[73] Assignee: Atlas Copco Aktiebolag, Nacka, Sweden

[21] Appl. No.: 871,393

[22] Filed: Jan. 23, 1978

[30] Foreign Application Priority Data

Jan. 21, 1977 [SE] Sweden ............... 7700621

[51] Int. Cl.² .................. F01N 1/20; F16K 17/00
[52] U.S. Cl. .................. 181/230; 181/237; 181/239; 181/269; 181/278; 137/514.3; 137/516.11; 137/538
[58] Field of Search ........... 181/207, 209, 230, 236, 181/237, 241, 278; 137/514.3, 516.11, 538

[56] References Cited

U.S. PATENT DOCUMENTS

| 541,609 | 6/1895 | Hazlehurst et al. | 181/237 |
| 585,084 | 6/1897 | Cook | 181/237 |
| 1,013,483 | 1/1912 | Gaa | 181/237 |
| 1,807,512 | 5/1931 | Culp | 181/278 |
| 3,219,144 | 11/1965 | Murray et al. | 181/278 |
| 3,722,854 | 3/1973 | Parola | 181/237 |

FOREIGN PATENT DOCUMENTS

| 1372464 | 8/1964 | France . |
| 385230 | 6/1976 | Sweden . |
| 364015 | 12/1930 | United Kingdom . |
| 425775 | 3/1935 | United Kingdom . |
| 916836 | 1/1963 | United Kingdom . |
| 1192627 | 5/1970 | United Kingdom . |
| 1322236 | 7/1973 | United Kingdom . |

Primary Examiner—L. T. Hix
Assistant Examiner—Benjamin R. Fuller
Attorney, Agent, or Firm—Frishauf, Holtz, Goodman and Woodward

[57] ABSTRACT

An exhaust muffler intended for noise dampening of, for instance, pneumatic tools, comprising a variable flow restricting passage, an attenuation chamber and a non-variable flow restricting passage. A valve body is arranged to control said variable flow restricting passage in response to the actual exhaust gas pressure. A movement dampening chamber, partly defined by the valve body, communicates with the atmosphere through a restriction opening to prevent resonance vibration of the valve body.

16 Claims, 2 Drawing Figures

EXHAUST MUFFLER

This invention relates to an exhaust muffler intended for dampening the exhaust noise from a motor, for instance a pneumatic vane motor.

In particular, the invention provide an exhaust muffler by means of which a good noise damping effect is obtained over the entire speed range of the motor, and by means of which the annoying low frequency noise generated during the starting and stopping sequences of a pneumatic vane motor is effectively reduced.

Further, the invention provides an exhaust muffler which is simple in construction and which is suitable for use with hand held pneumatic tools.

These and other characteristic features are obtained by the exhaust muffler defined in the claims.

DETAILED DESCRIPTION

As the invention is specially, though not exclusively, related to pressure air driven motors the following detailed description is referred to an exhaust muffler in connection with a pneumatic motor.

Figure 1:
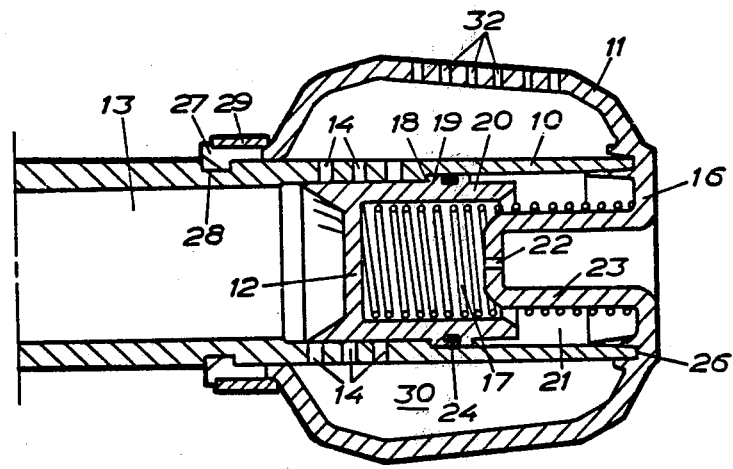
FIG. 1 shows a longitudinal section through an exhaust muffler according to a preferred embodiment of the invention.

The exhaust muffler shown in FIG. 1 comprises a cylinder 10, a housing 11 surrounding the cylinder 10 and a valve body 12 slidably guided in the cylinder 10.

The cylinder 10 is a tubular extension of a tubular outlet passage 13 communicating with the outlet of the pneumatic motor (not shown). The cylinder 10 is provided with a number or radially directed outlet openings 14 which are arranged to be successively covered or uncovered by the valve body 12. The joint uncovered area of the outlet openings 14 forms a variable flow restricting area. In the position shown in FIG. 1, this area is null since the valve body 12 covers all of the outlet openings 14.

In order to enable a smooth area increase when uncovering the outlet openings 14, the openings 14 are located along a helical line on the cylinder 10.

The cylinder 10 is provided with an end wall 16. A compression spring 17 is arranged to act between the valve body 12 and the end wall 16 of the cylinder, thereby excerting a force on the valve body 12 in the closing direction of the latter. The valve body 12 is balanced between the spring 17 and the actual exhaust gas pressure in the passage 13. The cylinder 10 also comprises an internal shoulder 18 for cooperation with an external shoulder 19 on the valve body 12. These shoulders define the fully closed position of the valve body 12.

At its rear end, the valve body 12 is formed with a sleeve portion 20, and defines together with the rear end wall 16 of the cylinder 10 a vibration dampening chamber 21. The vibration dampening chamber 21 communicates with the atmosphere through a restriction opening 22, and it is intended to prevent resonance vibrations of the valve body 12.

In order to enable use of a long compression spring 17 and at the same time keep down the volume of the dampening chamber 21, the end wall 16 is formed with a depressed portion 23. As the valve body 12 moves in its opening direction the depressed portion 23 will fully or partly be received in the sleeve portion 20 of the valve body. The depressed portion 23 also serves as a radial support for the compression spring 17. The valve body 12 is provided with a seal ring 24 in order to seal off the dampening chamber 21 from the exhaust passage 13.

As illustrated in FIG. 1, the end wall 16 of the cylinder 10 is formed in one piece with the housing 11. The housing 11, which in the shown example is formed in plastic, is slid axially onto the cylinder 10. In order to obtain a radial support for the housing 11 relative to the cylinder 10, the end wall 16 is provided with an annular groove 26 into which the end of the cylinder 10 is received. The housing 11 comprises a number of circumferentially distributed latch dogs 27 which engage an external annular groove 28 on the cylinder 10. The latch dogs 27 are retained in their engagement with the groove 28 by means of a clamp ring 29.

Between the housing 11 and the cylinder 10 there is enclosed an expansion or attenuation chamber 30 through which exhaust air passes from the openings 14 to vent openings 32 in the housing 11. The vent openings 32 form together a non-variable flow restricting passage which is the final outlet of the exhaust muffler.

The size of the non-variable flow restricting passage, i.e. the joint area of the vent openings 32, is substantially equal to the maximum size of the variable flow restricting passage, i.e. the joint area of those of the openings 14 that are uncovered by the valve body 12 at full speed running of the motor. This does not have to mean that all of the openings 14 are uncovered.

The compression spring 17 is pretensioned so as to keep the valve body 12 in the closed position until a certain pressure level is reached at starting up the motor or as soon as the exhaust pressure has dropped below said certain level when stopping the motor.

Figure 2:
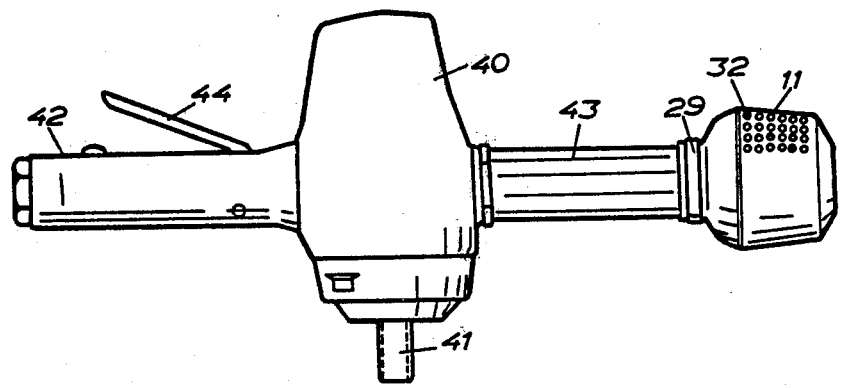
FIG. 2 shows a side elevation of a pneumatic tool utilized with an exhaust muffler according to the invention.

In FIG. 2 there is shown a pneumatic machine tool provided with an exhaust muffler according to the invention. The tool comprises a motor housing 40, an output shaft 41 and two opposite handles 42 and 43. One of these handles 42 forms the air inlet passage of the tool and comprises a supply valve which is operated by a trigger arm 44.

The other handle 43 forms the outlet passage 13 of the motor. At its outer end, the handle 43 is provided with an exhaust muffler of the type shown in FIG. 1.

By the arrangement of a valve body controlled flow restricting passage there is obtained a substantially constant pressure drop over the muffler independently of the outlet flow. This means in turn that a good noise dampening effect is obtained over the entire speed range of the motor.

Since the variable flow restricting passage of the muffler is completely closed as the exhaust gas pressure is interrupted, there is also obtained an effective dampening of the low frequency suction noise arising during the stopping sequence of the motor.

The embodiments of the invention are not limited to the shown and described example but can be freely varied within the scope of the invention.

What I claim is:

1. An exhaust muffler for pressure gas driven motors, comprising:
   exhaust gas receiving means adapted to be coupled to an exhaust outlet of a pressure gas driven motor;
   a variable flow restricting passage (14) coupled to said exhaust gas receiving means;

a spring biased valve body (12) in communication with said exhaust gas receiving means and with said variable flow restricting passage (14) and responsive to the actual exhaust gas pressure to maintain a constant pressure drop across the exhaust muffler by continuously adapting the area of said variable flow restricting passage (14) to the actual exhaust pressure; and a vibration dampening means (21,22) associated with said valve body (12) for preventing resonance oscillation of said valve body, said vibration dampening means comprising a chamber (21) partly defined by said valve body (12); and a restriction opening (22) connecting said chamber (21) to the atmosphere.

2. Exhaust muffler according to claim 1, wherein said restriction opening (22) is formed in said exhaust gas receiving means, said exhaust gas receiving means partly defining said chamber (21).

3. Exhaust muffler according to claim 1, wherein said exhaust gas receiving means comprises a cylinder (10) communicating with the exhaust outlet of the motor; and wherein said variable flow restricting passage comprises a plurality of radial openings (14) extending through the wall of said cylinder (10), said valve body (12) being axially movable within said cylinder (10) to selectively open or block said radial openings responsive to said exhaust gas pressure to control the joint or total area of said radial openings in response to the actual exhaust gas pressure.

4. Exhaust muffler according to claim 3, wherein said cylinder (10) at least partly defines said chamber (21).

5. Exhaust muffler according to claim 4, wherein said cylinder (10) has an end wall (16) which at least partly defines said chamber (21).

6. Exhaust muffler according to claim 5, wherein said restriction opening (22) is formed in said end wall (16).

7. Exhaust muffler according to claim 3, wherein said radial openings (14) are distributed in a helical pattern on said cylinder (10).

8. Exhaust muffler according to claim 3, comprising a compression spring (17) for biasing said valve body (12), and wherein said cylinder (10) has an end wall (16) which forms a reaction support for said compression spring (17) by means of which said valve body (12) is balanced against the exhaust gas pressure, and said end wall (16) having a depressed portion (23) extending into said cylinder (10) to reduce the volume of said dampening chamber (21).

9. Exhaust muffler according to claim 8, wherein said radial openings (14) are distributed in a helical pattern on said cylinder (10).

10. Exhaust muffler according to claim 8, wherein said restriction opening (22) is located in said depressed portion (23).

11. Exhaust muffler according to claim 3, comprising a housing (11) surrounding at least a portion of said cylinder (10), said housing (11) being provided with one or more vent openings forming a non-variable flow restricting passage (32) in gas communication with said variable flow restricting passage (14), an attenuation chamber (30) being formed between said housing (11) and said cylinder (10).

12. Exhaust muffler according to claim 11 wherein said housing (11) completely surrounds at least a lengthwise portion of said cylinder (10).

13. Exhaust muffler according to claim 11, wherein said end wall (16) and housing (11) are integrally formed.

14. Exhaust muffler according to claim 3, wherein said cylinder (10) has an end wall (16) which at least partly defines said chamber (21).

15. Exhaust muffler according to claim 14, wherein said end wall (16) and housing (11) are integrally formed.

16. Exhaust muffler according to claim 1, wherein said exhaust gas receiving means comprises a cylinder (10) communicating with the exhaust outlet of the motor; and wherein said variable flow restricting passage comprises a plurality of radial openings (14) extending through the wall of said cylinder (10), said valve body (12) being axially movable within said cylinder (10) to selectively open or block said radial openings responsive to said exhaust gas pressure to control the joint or total area of said radial openings in response to the actual exhaust gas pressure.

* * * * *